UNITED STATES PATENT OFFICE.

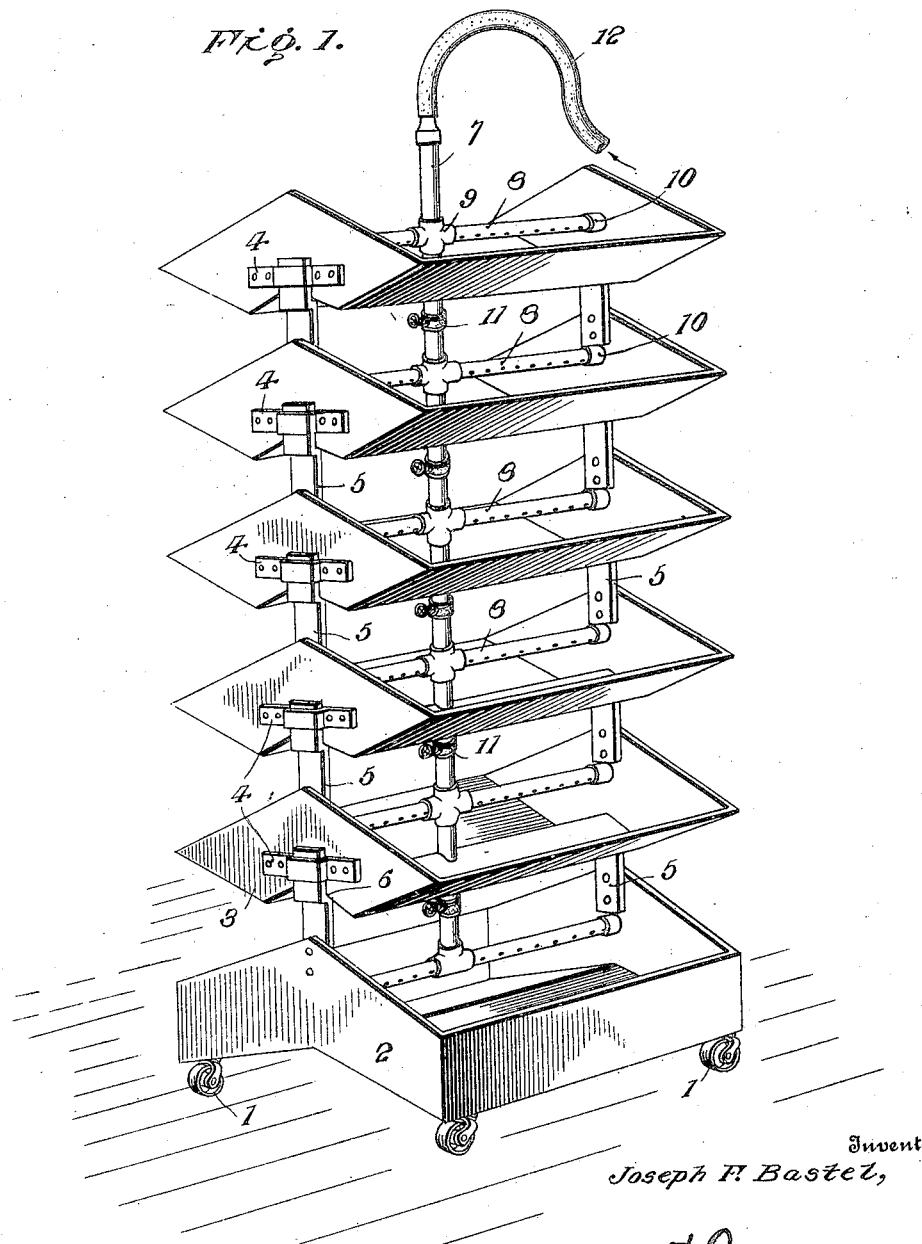

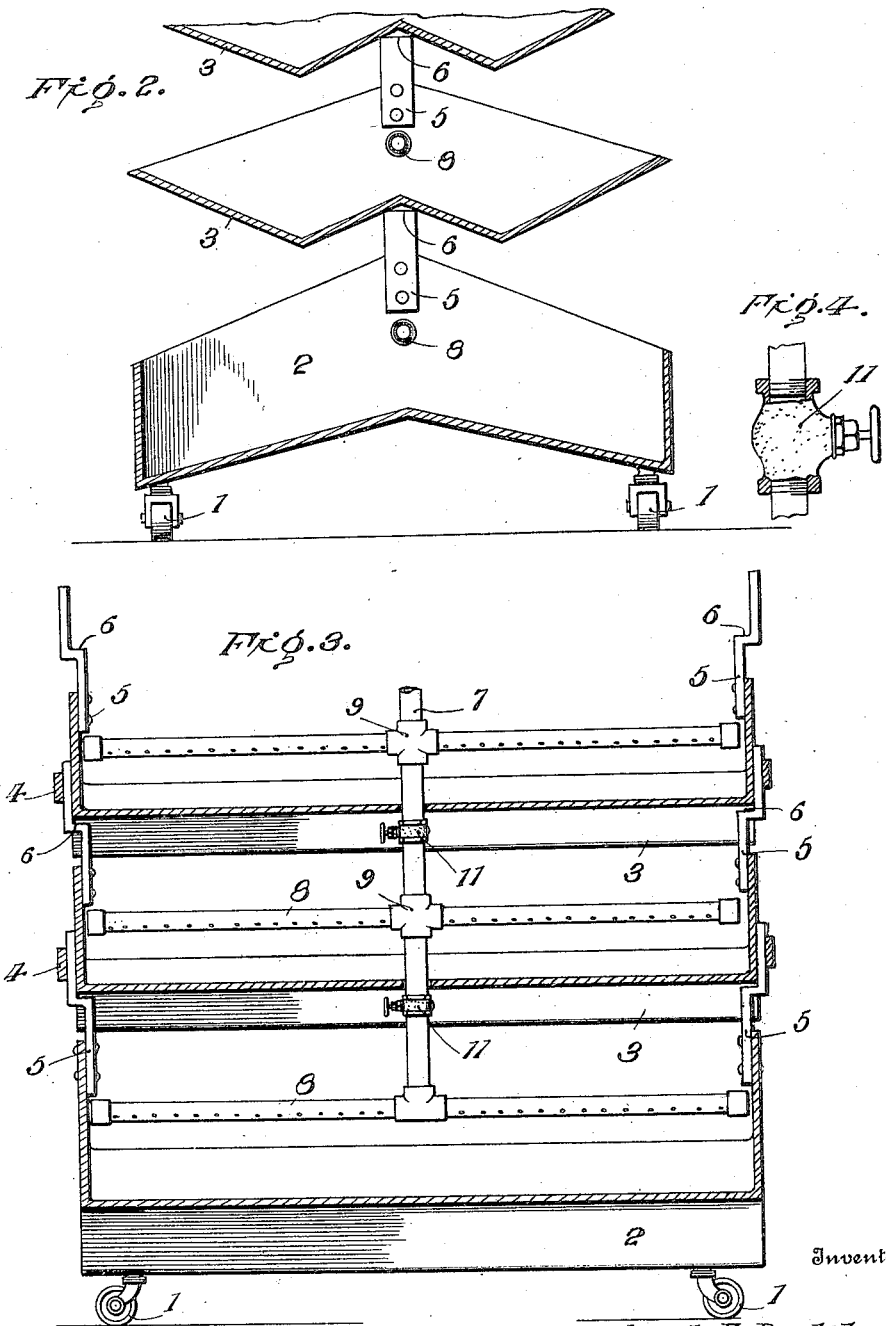

JOSEPH F. BASTEL, OF ST. LOUIS, MISSOURI.

PORTABLE STAND FOR FLOWERS, &c.

No. 875,235.  Specification of Letters Patent.  Patented Dec. 31, 1907.

Application filed April 27, 1907. Serial No. 370,727.

*To all whom it may concern:*

Be it known that I, JOSEPH F. BASTEL, citizen of the United States, residing at St. Louis, in the county of St. Louis City and State of Missouri, have invented certain new and useful Improvements in Portable Stands for Flowers, &c., of which the following is a specification.

This invention is primarily designed for economizing space and to insure thorough irrigation when utilized for growing flowers or vegetables.

In accordance with this invention, the stand comprises a series of superposed trays or boxes adapted to receive earth when used for growing plants or to receive commodities of any kind according to the required use, the stand being portable and mounted upon casters so as to be easily moved from one place to another and the trays or boxes being removable to admit of conveniently handling the parts or of preparing the bed or transplanting seedlings or young plants.

The invention also provides novel irrigating means for supplying moisture directly to the earth, said irrigating means being composed of separable parts to admit of their number corresponding to the number of trays or boxes contained in a stand and also to admit of the trays or boxes being separated or placed together.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a portable stand embodying the invention. Fig. 2 is a vertical central longitudinal section of a portion of the stand. Fig. 3 is a transverse section of the parts indicated in Fig. 2. Fig. 4 is a sectional view of the valve coupling between the sections of the irrigator.

The stand comprises a plurality of trays or boxes placed one above the other in vertical position and spaced apart any required distance. The trays or boxes are of like construction. The lowermost tray or box is provided with casters to admit of moving the stand from one position to another. Each tray or box comprises oppositely inclined portions 2, the purpose being to provide a maximum surface to be reached by sunlight which is essential for growing plants. The ends of trays or boxes are parallel and occupy a vertical position when the trays are assembled. The sides 3 of the trays or boxes are inclined or slope upwardly from their lower edges, this arrangement admitting of the sunlight reaching opposite portions of the trays when the stand is located in an advantageous position to admit of the sun striking both portions of the stand during the morning and afternoon of each day. The lowermost tray or box differs from the remainder only in having its sides 3 perpendicular, thereby admitting of the casters 1 being spread apart transversely a maximum distance so as to form ample support for the stand and prevent its toppling over.

For sustaining the trays or boxes in superposed position, a keeper 4 is applied to each end of a tray upon the outer side near the lower edge thereof and a bracket 5 is attached to the inner side of each end at or near the upper edge and projects above the latter. Each bracket 5 is formed with an offset near its upper end to provide a shoulder 6 which engages under the tray or box next above and supports the same. The brackets 5 and keepers 4 have a central arrangement as indicated most clearly in Fig. 1, thereby resulting in an equal distribution of the weight upon each side of the suspending and connecting means. The keepers 4 consist of strap irons having a middle portion bent to provide a loop to receive the upper portion of brackets above the shoulders 6. The brackets 5 are likewise formed of strap iron, and by being secured to the inner sides of the end pieces 2, enable the shoulders 6 to engage under the tray next above when the trays are placed in position. It is to be understood that while the trays are of like formation, they may vary in size from bottom to top in progressive order so as to give the stand a tapered appearance.

Inasmuch as the primary purpose of the invention is for plants, irrigating means are shown in connection therewith, the same consisting of a main or vertical pipe 7 constituting the feeder and horizontal or branch pipes 8 for distributing the water. The feeder and distributer pipes are connected by fittings 9 having coupling ends. The outer ends of the distributing pipes 8 are closed by means of caps 10, the distributing pipes are perforated throughout their length for the escape of water in minute jets. The irrigator is formed of sections which are joined by means of couplings 11 similar to those employed for connecting hose pipes and other tubing required to be disconnected so that the several sections of the irrigator may be separated or joined according as the stand is separated or the parts placed together. The vertical pipe 7 is composed of a series of short lengths which are connected by the fittings 9 and couplings 11. A hose pipe 12 is adapted to be fitted to the feeder or pipe 7 for connecting the same to a service pipe or other source of water supply. When assembled, the distributing pipes 8 occupy a position above the crest of the respective trays, thereby admitting of the water being supplied to each portion of the tray. It is preferred to have the distributing pipes 8 buried in the soil which fills the trays so that said soil and the roots of the plants may be thoroughly moistened, and by supplying the water at a central point, which in the present instance is elevated, it will readily pass each way from the median line so as to thoroughly irrigate the soil contained in each portion of a tray.

In the preferred construction, the couplings 11 between the sections of the irrigator consist of valves whereby the supply of water to the trays or boxes may be regulated to insure a uniform supply of moisture without preventing the lower sections being flooded. The tendency by reason of the pressure being greatest at the bottom is for the lower sections to receive a greater supply of water than the upper sections, and by proper manipulation of the valves 11, the supply of water to the trays may be made practically uniform or controlled as may be required.

Having thus described the invention, what is claimed as new is:

1. A stand comprising a series of superposed trays, each tray having opposite ends parallel and adapted to occupy a vertical position and having opposite sides upwardly and outwardly inclined and supporting means for the several trays applied to the end pieces thereof and off-set between their ends to provide supporting shoulders.

2. A stand comprising a series of superposed trays and brackets having end portions attached to opposite sides of corresponding portions of adjacent trays and having off-set portions between their ends to form supporting shoulders, and having the extensions above said shoulders embracing outer sides of the trays resting thereon and held thereto to maintain the several trays in fixed position when placed together.

3. A stand comprising a plurality of superposed trays, keepers applied to opposite sides of the trays, and brackets likewise secured to opposite sides of the trays and having off-set portions to provide supporting shoulders and having the ends above said shoulders adapted to engage said keepers, whereby the trays when assembled are held in fixed position.

4. In combination, a series of vertically arranged trays, each tray comprising oppositely inclined portions, a centrally disposed feeder pipe, and a series of distributing pipes having connection with the main feeder pipe and located at a point intermediate of the oppositely inclined portions of the trays.

In testimony whereof I affix my signature in presence of two witnesses.

JOSEPH F. BASTEL. [L. S.]

Witnesses:
 CHARLEY A. REICHERT,
 FRED M. REICHERT.